Figure 1:
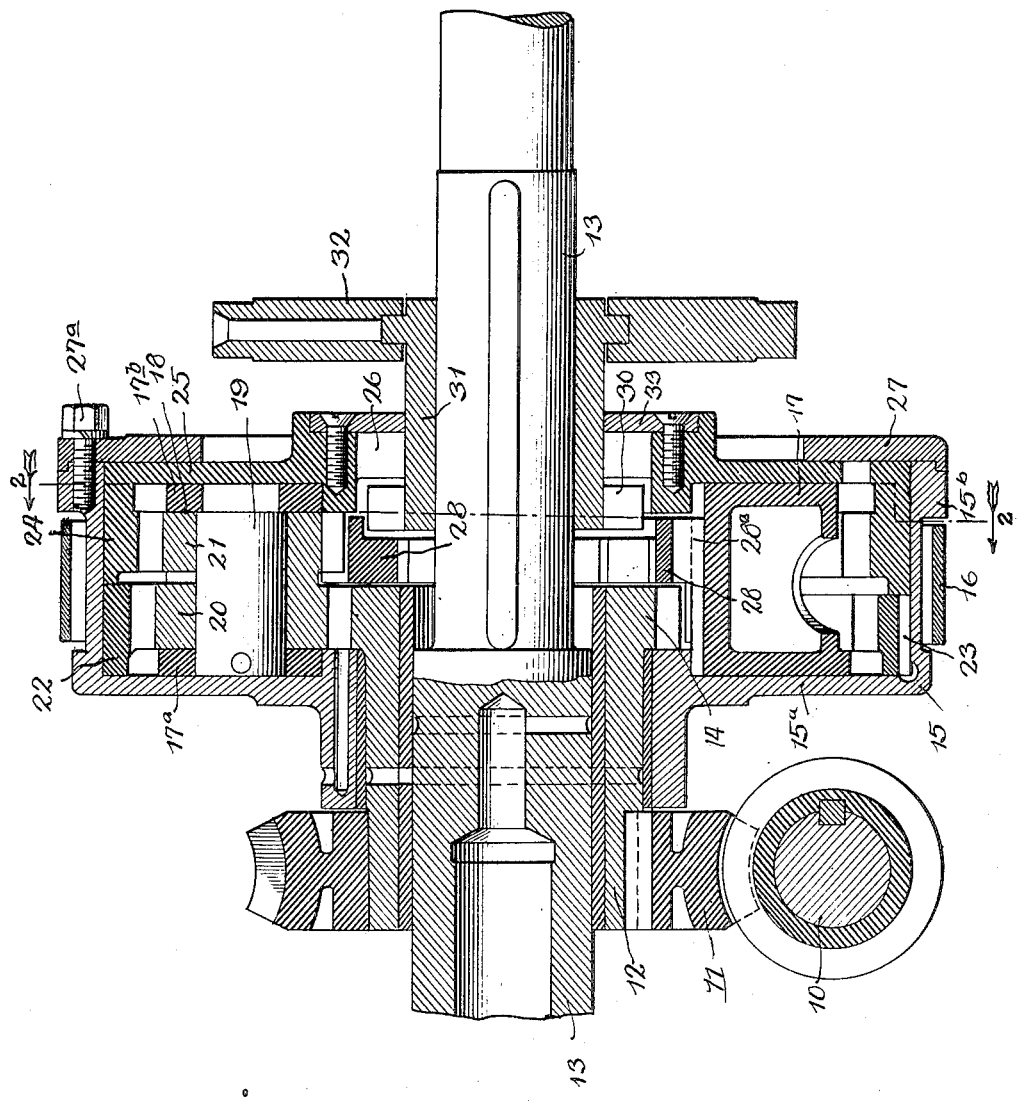

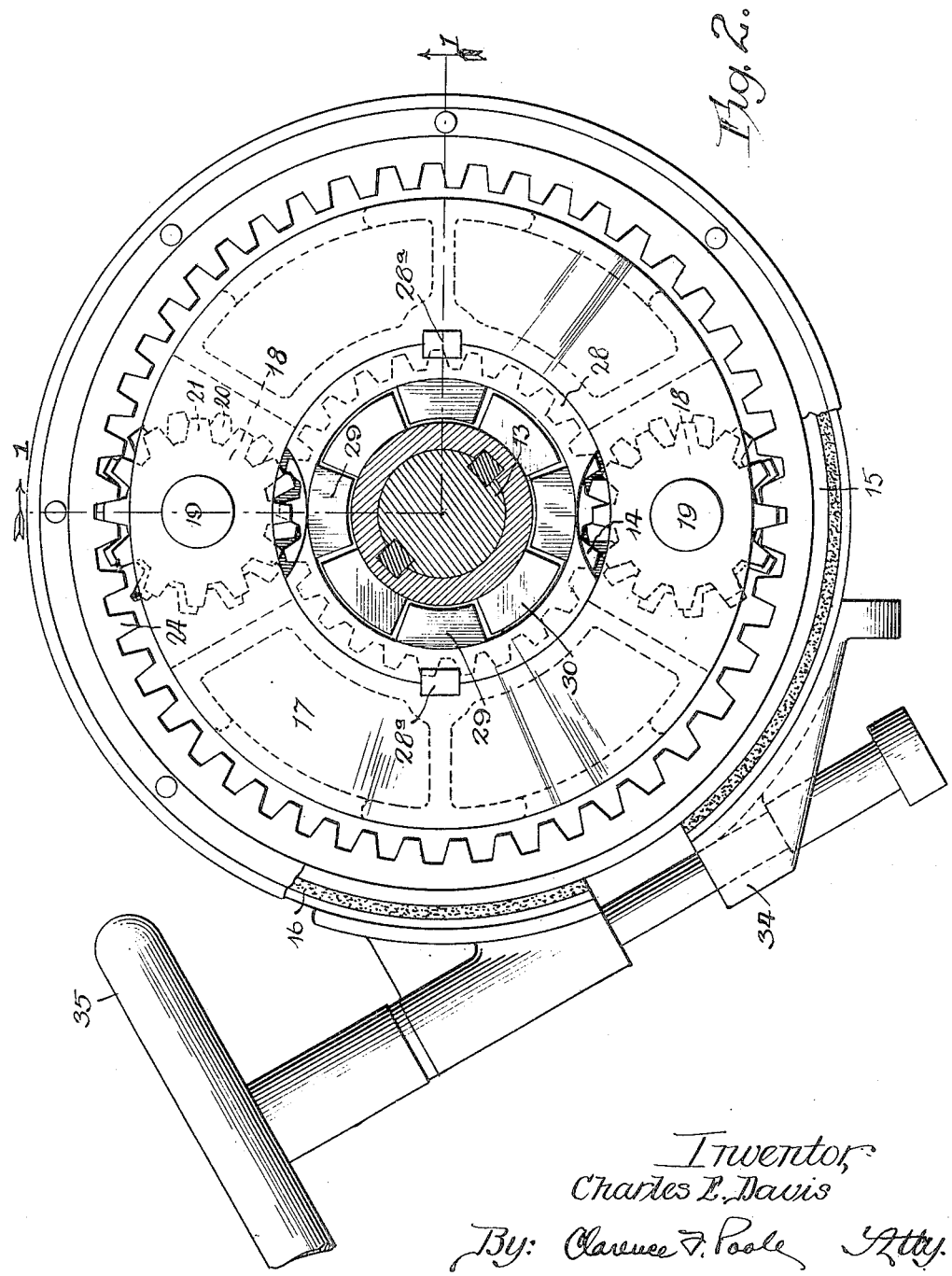

Patented Oct. 3, 1922.

1,430,799

UNITED STATES PATENT OFFICE.

CHARLES E. DAVIS, OF CHICAGO, ILLINOIS, ASSIGNOR TO GOODMAN MANUFACTURING COMPANY, OF CHICAGO, ILLINOIS, A CORPORATION OF ILLINOIS.

TRANSMISSION DEVICE.

Application filed November 22, 1920. Serial No. 425,631.

*To all whom it may concern:*

Be it known that I, CHARLES E. DAVIS, a citizen of the United States, residing at Chicago, in the county of Cook and State of Illinois, have invented a Transmission Device, of which the following is a specification.

This invention relates to transmission devices and more particularly to planetary transmission gearing. The primary object of this invention is to provide a planetary gear unit which is simple in construction and capable of affording a wide range of speeds.

The invention may best be understood by reference to the accompanying drawings in which, Figure 1 is a longitudinal section of a transmission unit constructed in accordance with my invention.

Figure 2 is a transverse cross-section taken on line 2—2 of Figure 1.

In the embodiment illustrated in my invention, a driving shaft 10 is meshed with a worm gear 11 which is keyed to a hollow sleeve 12 mounted on a driven shaft 13. Said sleeve 12 is provided at one end with a gear pinion 14 which constitutes the sun gear of the transmission device. An annular casing 15 is loosely mounted on the exterior of the sleeve 12 and has a bearing thereon intermediate the worm gear 11 and the pinion 14. Said casing 15 comprises a web portion 15ᵃ and a cylindrical portion 15ᵇ having a suitable friction band 16 on its outer periphery for controlling the rotation of said casing. Mounted within said casing and concentric therewith is a ring shaped cage 17 in which is carried a plurality of planetary gears 18—18, mounted on suitable pins 19—19 having bearings at their ends in the lateral faces 17ᵃ and 17ᵇ of said cage. In the embodiment illustrated, two of such planetary gears are provided, but it is manifest that more than two such gears may be employed if desired.

Each of said planetary gear members 18—18 comprise two pinions 20 and 21, connected together so as to rotate as a single unit. The pinion 20 of each planetary gear has a larger pitch diameter than its companion pinion 21 and is meshed with the sun gear 14. An internal gear ring 22 is mounted within the casing 15 and keyed to rotate therewith as indicated at 23. Said internal gear is meshed with the pinions 20 of the planetary gears 18 as shown. Adjacent the internal gear 22 is a second internal gear 24, mounted free to turn in the casing 15. Said internal gear has a smaller pitch diameter than the gear 22 and is meshed with the pinions 21 of the planetary gear members 18. Attached to the internal gear 24, is an end plate 25 having a clutch member 26 affording a low speed driving connection to the driven shaft through one train of gears as will hereinafter appear. A retaining ring 27 is attached to the periphery of the casing 15 by means of suitable bolts 27ᵃ and engages the outer face of the ring 25 to form an oil and dust-proof enclosure for the gearing therein.

The high speed connection to the driven shaft 13 comprises an annular clutch ring 28 seated within the cage 17 and keyed thereto by keys 28ᵃ—28ᵃ. This clutch ring is provided with a plurality of inwardly extending clutch jaws 29—29 adapted to engage with outwardly extending clutch jaws 30—30 carried by a sliding clutch member 31. Said clutch member is feathered on the driven shaft 13 so as to rotate therewith, and is adapted to be shifted longitudinally thereon by any suitable mechanism such as a collar and yoke device indicated by 32. In the position of the clutch member 31 illustrated in Figure 1, the clutch jaws 30—30 are in neutral position, i. e., intermediate, and disengaged from, the clutch ring 28 of the high speed connection and the clutch member 26 of the low speed connection. The driving connection between the high speed and low speed connection is made by shifting the clutch member 31 to the right or left of its neutral position. A second retaining ring 33 is attached to the outer face of the end plate 25 adjacent the clutch member to form a closure between the end plate 25 and clutch member 31.

The friction band 16 may be of any approved design, attached to the main frame by means of a bracket 34 and adjusted by means of hand wheel 35 or similar mechanism suitable for this purpose.

The train of gears comprising the two gear ratios may now be traced as follows: The high speed drive takes place through the worm 13, pinion 14, planetary gears, 19, cage 17, clutch ring 28 and clutch member 31. It will be seen that when the clutch member 31 is in engagement with the clutch ring 28, the pinion 14 rotates the planetary gears 18 about their respective axes. The planetary gears are meshed with the internal gear 23 keyed to the casing, 15, and therefore produce a torque on said casing in the direction opposite to the movement of the sun gear 14. When the friction band 16 is adjusted so as to restrain said casing from rotation, the planetary gears will be rotated on their own axes and at the same time will be carried about the main axis of the sun gear and will carry therewith the cage 17 on which they are mounted. There will be a reduction of speed between the sun gear 14 and the cage 17 depending upon the relative pitch diameters of the respective gears. The clutch ring 28 being keyed to the cage 17, will be carried therewith, and in turn, may be engaged to the driven shaft 13 by means of the clutch member 31.

When it is desired to afford a reduction in speed through the arrangement of gearing just described, the friction band 16 may be released so as to allow the casing 15 to rotate slowly. It has already been pointed out there is a driving torque being constantly impressed upon the said casing through the medium of the planetary gears 20, and when said casing is partially released by the friction device, a portion of the power will be used in rotating said casing against the friction, with the corresponding decrease in the speed of rotation, of the driven shaft 13. By variation of the friction imposed by the band 16, a wide range of speeds may be obtained. It will also be observed that in case of excessive strains or sudden stoppage on the driven shaft 13, the friction band 16 will have a slipping hold on the casing 15 so that the latter may rotate and protect the mechanism from danger of breakage.

The low speed driving connection takes place through the following train of gears: worm 13, sun gear 14, planetary gears 18, gear pinions 21, internal gear 24, end plate 25, clutch member 26, and clutch member 31. It has been stated that the pitch diameters of the planetary gear pinions 21 are less than that of the companion pinions 20, so that for every complete revolution of said planetary gear 18, the internal gear 24 will be advanced with respect to the internal gear 22 the difference in the respective pitch circumferences of the planetary pinions 21 and 20. It will therefore be seen the internal gear 24 will be driven at a considerably reduced speed, which is much less than the speed of the cage 17 and gearing 28 through which the high speed connection is made. The gear ratio between the driving and the driven member is in a fixed proportion depending upon the relative pitch diameters of the gears involved, providing the casing 15 is restrained from rotation. But as has been already noted with respect to the high speed connection, the friction imposed on the casing 15 by the band 16 may similarly be varied so as to produce a wide variation in speeds through the low speed connections. Also, the said friction band has a slipping hold on the casing 15, so that the latter may be rotated in case of excessive strains in the same manner as with the high speed connection to protect the mechanism from breakage.

From the above description, it will be seen that one of the advantages of my improved device is the provision of means whereby two different gear ratios may be interposed between the driving and the driven members, and each of which gear ratios are subject to wide variations in effective power transmission controlled by a single friction device. A further advantage is the provision of a friction control element operative under all driving conditions to afford a slipping hold in case of excessive strains on the driving mechanism.

I claim as my invention:

1. In a transmision device, the combination of a driving gear, a rotatable casing concentric with said gear, a variable friction device for controlling the rotation of said casing, a rotatable cage mounted within said casing having a planetary gear unit mounted thereon, said gear unit comprising two gears, one of which is engaged with said driving gear and said rotatable casing, a low-speed gear concentric with said casing and engaged by the second planetary gear, an end plate carried by said low-speed gear and adapted to form a closure for said casing, a driven shaft, and means affording selective operative connection of said shaft with said cage or with said end-plate.

2. In a transmission device, the combination of a driving gear, a rotatable casing concentric with said gear, a variable friction device for controlling the rotation of said casing, a rotatable cage mounted within said casing having planetary gearing mounted thereon, said gearing comprising two gears, one of which is engaged with said driving gear and said rotatable casing, a low-speed gear concentric with said casing and engaged by the second planetary gear, a movable clutch member interposed between and adapted to have engagement with either said cage or said low-speed gear and a shaft having operative connection with said clutch.

3. In a planetary transmission device, the combination of a driving shaft, a driving pinion, a rotatable casing mounted concentrically with said pinion, an internal gear carried by said casing, a rotatable cage having a planetary gear unit mounted thereon, provided with two pinions one of which is meshed intermediate the driving pinion and said internal gear, and the other of which has a smaller pitch diameter than the first named planetary pinion, a low-speed gear mounted concentrically with said cage and meshed with said second named planetary pinion, a driven shaft adapted to have selective operative connection with said cage or with said low-speed gear, and a variable friction device for controlling the rotation of said rotatable casing.

4. In a planetary transmission device, the combination of a driven shaft, a driving pinion mounted to rotate on said shaft, a rotatable casing mounted concentrically with said pinion, an internal gear carried by said casing, a rotatable cage within said casing having a planetary gear mounted thereon, provided with two pinions, one of which is meshed intermediate the driving pinion and the first mentioned internal gear, and the other of which has a smaller pitch diameter than the first named planetary pinion, a second internal gear mounted free to rotate within said casing adjacent said first-mentioned gear and meshed with said second named planetary pinion, means for affording a selective driving connection between said cage and said driven shaft or said second named internal gear and said shaft, and a variable friction device adapted to control the rotation of the rotatable casing.

Signed at Chicago, Illinois, this 15th day of November, 1920.

CHARLES E. DAVIS.